May 17, 1960   W. A. ESCHENBURG ET AL   2,936,800
TWIN RIPSAW WITH OPPOSITELY DRIVEN BLADES AND POWER FEED
Filed Sept. 12, 1957   5 Sheets-Sheet 1

INVENTORS.
William A. Eschenburg,
Alvin George Stauber +
By:- Harry C. Marks.
Cromwell, Greist + Warden INVENTORS.
William A. Eschenburg,
Alvin George Stauber &
By Harry C. Marks
Cromwell, Greist & Warden

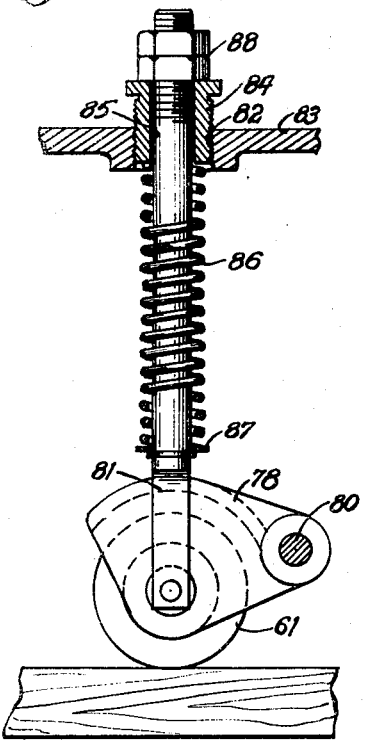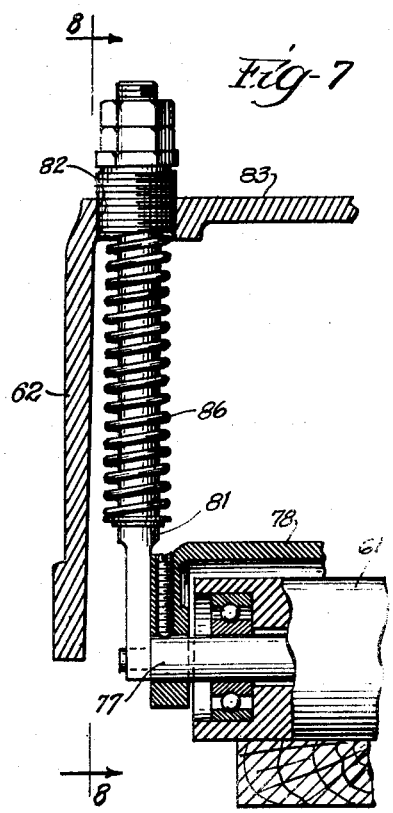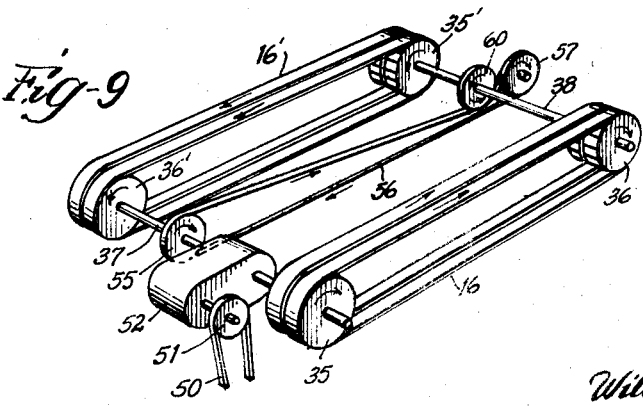

United States Patent Office 2,936,800
Patented May 17, 1960

2,936,800

TWIN RIPSAW WITH OPPOSITELY DRIVEN BLADES AND POWER FEED

William A. Eschenburg, Alvin George Stauber, and Harry C. Marks, Beloit, Wis., assignors to Yates-American Machine Company, Beloit, Wis., a corporation of Delaware Application September 12, 1957, Serial No. 683,598

2 Claims. (Cl. 143—49)

This invention relates to power driven cutting tools and is more particularly concerned with improvements in a machine for rip sawing wood or similar materials.

Straight line rip saws have heretofore been provided which comprise a single saw blade and associated work feeding conveyor mechanism mounted in a supporting frame having a relatively wide work supporting table top over one side of which the board or work piece is passed in one direction for a cutting or ripping operation by the blade with the remainder of the board being manually returned across the other side of the table in a reverse direction for repeating the cutting operation. In using such a saw two operators are employed, one at each side of the machine, for handling the work with the work being fed to the cutting blade by the operator at one side of the machine and the cut strips being removed from the table and delivered to a conveyor or pile by the operator at the other side of the machine, the latter also returning the remainder of the work piece on which further cuts are to be made across the table to the first operator. With this procedure the operator who feeds the work to the machine for the cutting operation is idle part of the time while he waits for the return of the work piece before making the next cut. The operator at the other side of the machine is kept busy since he must not only remove the cut strip but he must also return the remainder of the work piece. However, the portion of his time which is required for the latter task is non-productive. Also, the volume of production or the number of cuts which can be obtained with the machine is limited by the speed with which this operator performs his task. Consequently, it has long been recognized that there are disadvantages in using this type machine and various proposals have been made for changing the operation of the machine in order to provide for more efficient use and greater production. However, none of the changes proposed have resulted in sufficient savings in cost to warrant adoption. It is a general object, therefore, of the present invention to provide an improved straight line rip saw which is adapted to be operated by the same number of operators heretofore provided with greatly increased production and substantial savings in labor costs.

It is a more specific object of the invention to provide a straight line rip saw wherein a pair of blade receiving arbors are rotatably mounted in a supporting frame having a work supporting top with laterally spaced apertures for accommodating the blades and power driven feed chains associated with each of the blades which are driven in opposite directions so that successive cutting operations may be performed with the direction of movement of the work being reversed, thereby permitting a work piece to be passed to the machine in one direction for a first cutting operation and to be returned in the opposite direction for a second cutting operation.

It is a more specific object of the invention to provide a straight line power driven rip saw wherein a work table is supported on an upright frame, a pair of saw arbors are mounted in laterally spaced relation for supporting cutting blades in laterally spaced work slots in the table, work feeding conveyors are associated with the cutting blades which are mounted on end support members mounted in parallel shafts with the support members at the opposite ends of the respective conveyors being driven by a common source of power and in opposite directions whereby a work piece may be passed through the machine for a cutting operation by one of the blades and immediately returned through the machine in the opposite direction for a second cutting operation by the other one of the blades.

It is a further object of the invention to provide a straight line rip saw having a series of hold down rollers supported in a frame above the cutting blade and its associated work feeding conveyor with the hold down rollers mounted on pivoted arms having improved pressure applying mechanism.

It is another object of the invention to provide a straight line rip saw which comprises an upright support having a work table, a pair of power driven blade supporting arbors positioned in laterally spaced relation on the support, and pairs of work feeding chains associated with the arbors which are supported on longitudinally spaced end sprockets, with the sprockets at the corresponding ends of the chains being mounted on a common power driven shaft, the sprockets for one pair of chains being keyed on the shaft and the sprockets for the other pair of chains being rotatably mounted thereon.

These and other objects and advantages of the invention will be apparent from a consideration of the power driven machine for rip sawing wood or similar materials which is shown by way of illustration in the accompanying drawings wherein:

Figure 7 is a section taken on the line 7—7 of Figure 1, on an enlarged scale;

Figure 8 is a section taken on the line 8—8 of Figure 7; and

Figure 9 is a diagrammatic layout of the drive mechanism for the work feeding conveyors.

Figure 1:
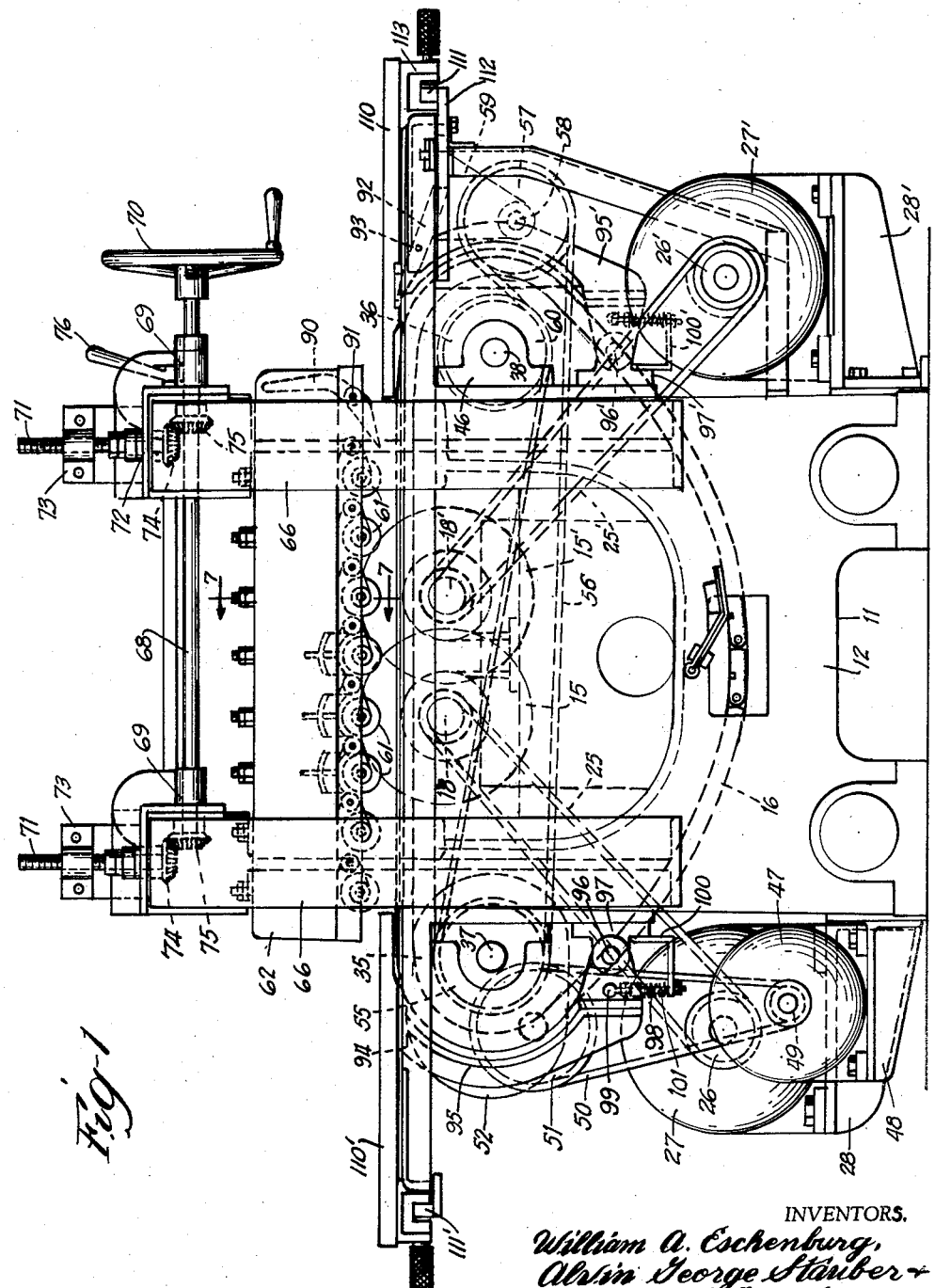
Figure 1 is a side elevation of a power driven machine for rip sawing operations which embodies the principal features of the invention.
Figure 2:
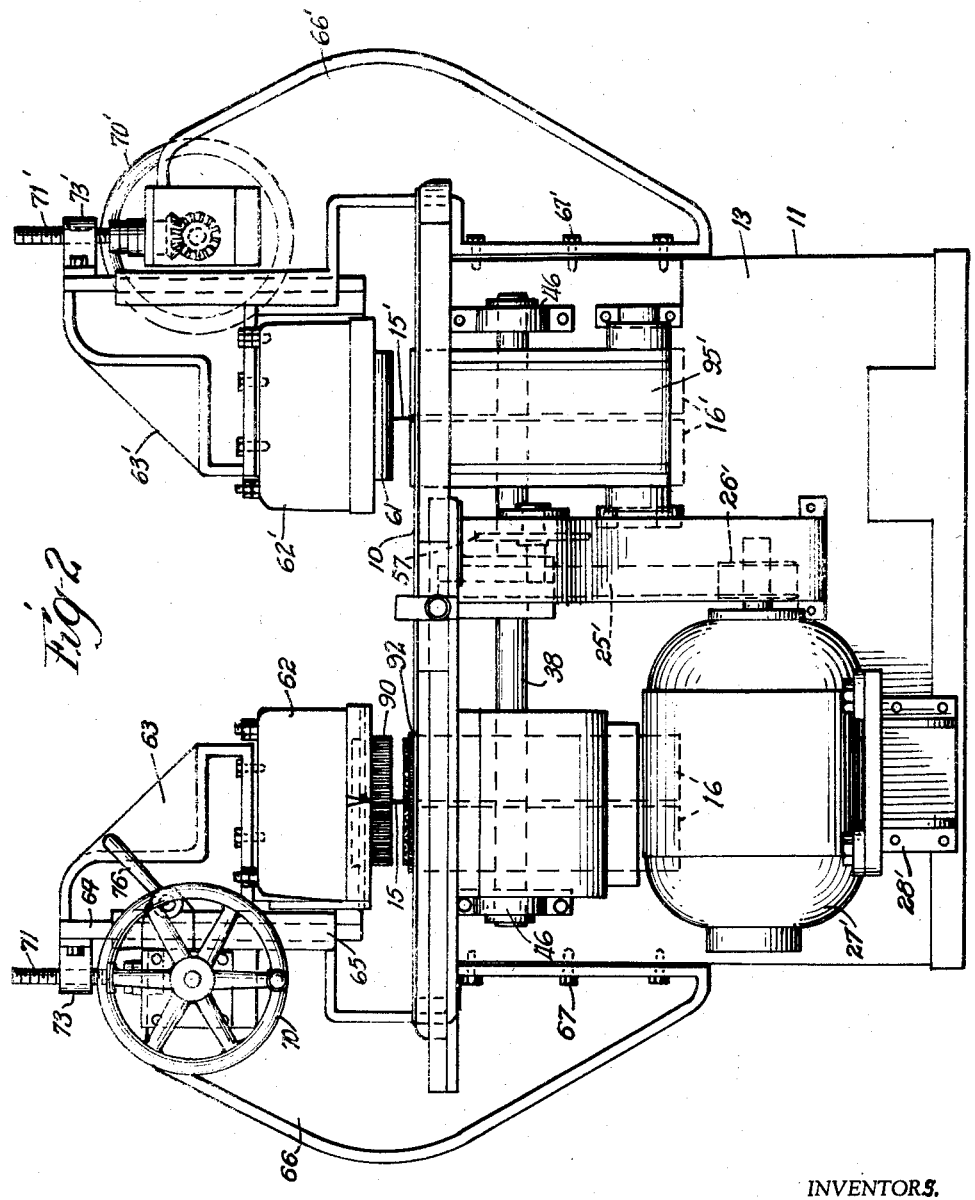
Figure 2 is an end elevation of the machine.

Referring to the drawings there is illustrated a power driven table or cabinet type material cutting machine which has incorporated therein mechanism embodying the principal features of the invention and which is characterized by dual saw blades and associated work feeding mechanisms combined in a single machine so as to permit successive straight line cutting operations in opposite directions on a board or other work piece with the same number of operations heretofore employed in operating a single blade machine and thereby effecting substantial savings in the time and labor required for such operations.

The illustrated machine comprises a generally rectangular horizontal work supporting table 10 which forms the top of an upright cabinet 11, the latter having oppositely disposed side and end walls 12 and 13 which are apertured as required to accommodate the control members and other projecting portions of the blade carrying and driving mechanism which it houses.

The work table 10 is constructed to accommodate two laterally spaced cutting mechanisms which are substantially identical and which are arranged in symmetrical relation about the longitudinal center line of the machine and only one of which will be described in detail with the corresponding elements of the other being indicated by the same numerals primed. The table 10 is provided with parallel laterally spaced apertures 14 and 14' which are adapted to accommodate the saw blades 15 and 15', of the respective cutting mechanisms, which have work feeding conveyors 16 and 16' associated with the blades.

Figure 3:
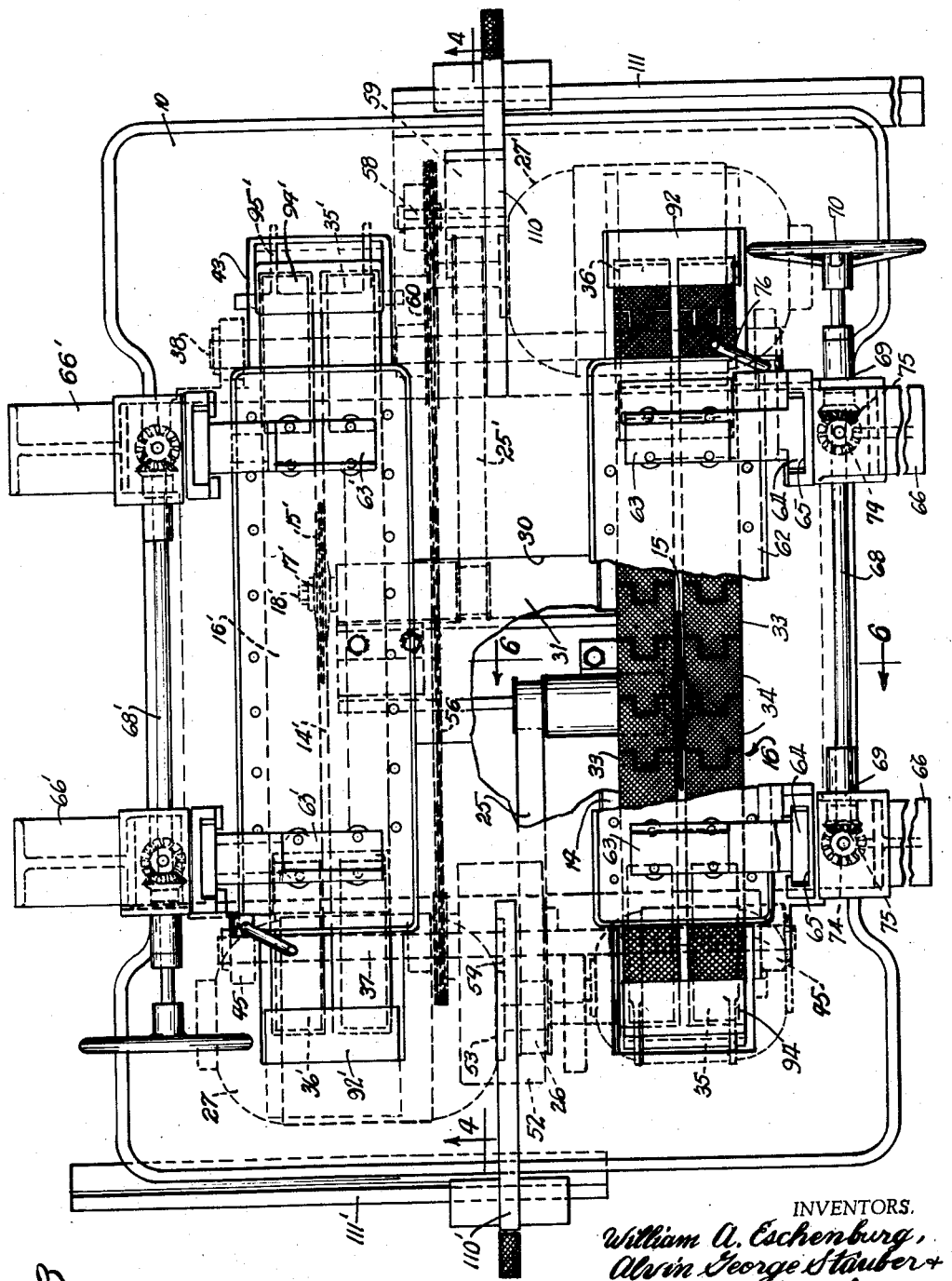
Figure 3 is a plan view of the machine, with portions broken away and with parts thereof shown schematically.
Figure 4:
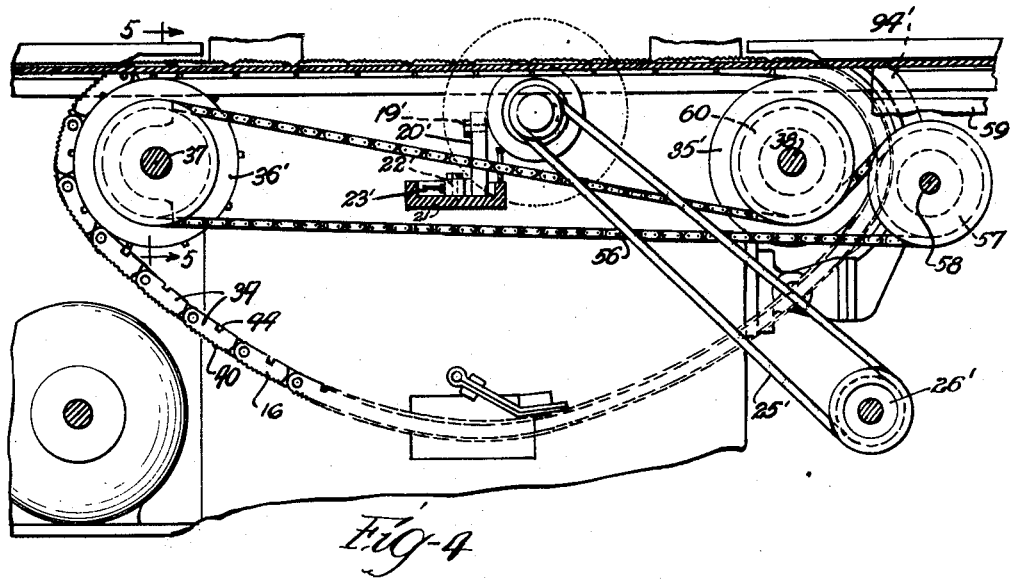
Figure 4 is a section taken on the line 4—4 of Figure 3.
Figure 5:
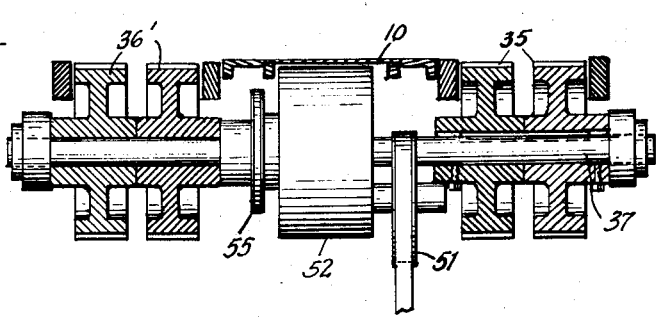
Figure 5 is a section taken on the line 5—5 of Figure 4.
Figure 6:
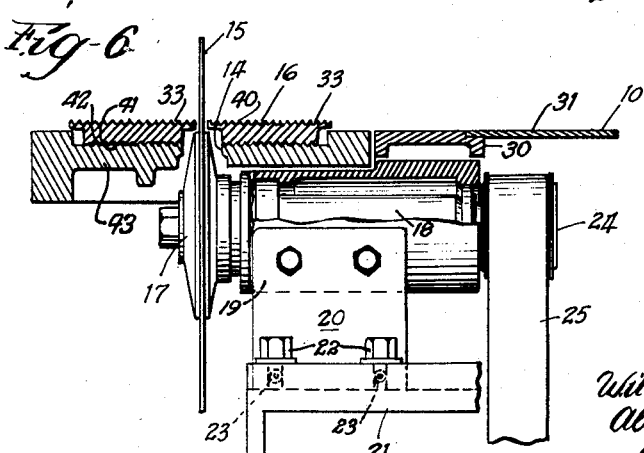
Figure 6 is a section taken on the line 6—6 of Figure 3, on an enlarged scale.

The blade 15 of the cutting mechanism on the near side of the table 10 in Figure 3 is secured by a clamping nut 17 (Figure 6) on the threaded end of an arbor 18 which is in turn supported with its axis extending transversely of the machine in a bearing bracket 19 attached to the upstanding leg of an angle support bracket 20. The arbor supporting bracket 20 has its horizontal leg seated in an upwardly facing channel shaped across frame member 21 and secured by a bolt and slot connection 22. Longitudinal adjustment is provided by adjusting screws 23 extending between the outer end of the horizontal leg of the bracket 20 and an upstanding flange of the support member 21. The cross support member 21 is supported above the base frame between the two saw blades 15 and 15'. The saw arbor 18 is provided with a belt receiving pulley 24 at its other end which is connected by a drive belt 25 with the drive pulley 26 on a motor 27, Figure 1, the latter being supported on a bracket 28 mounted on the frame end plate 13. The table 10 is provided with a center aperture 30 (Figure 3) having a cover plate 31 to provide access to the saw arbors and their mountings.

The blade 15 extends in a vertical plane in the longitudinal center of the upper run of a work feeding conveyor 16 (Figures 1, 3, 4 and 6). The conveyor 16 comprises a pair of chains 33, each consisting of a series of pivotally connected link members 34 supported on longitudinally spaced pairs of end sprockets 35 and 36 which are mounted at opposite ends of the aperture 14, on parallel longitudinally spaced shafts 37 and 38. The conveyor links 34 are grooved in two directions on their upper or outer faces to provide a knurled surface 40 and longitudinally grooved on their bottom or inner faces 41 for cooperation with the longitudinally grooved upper surfaces 42 of guideway forming ledges 43 adjoining the blade accommodating aperture 14, the ledges 43 being spaced below the table surface and forming a recessed guideway for the conveyor links 34, with the upper surfaces of the latter extending above the table surface a sufficient distance to carry the work piece through the machine without undue drag on the table. A cross groove 44 is provided in the bottom face of each link 34 for cooperation with teeth provided on the end supporting sprockets 35 and 36.

The sprocket supporting shafts 37 and 38 (Figures 1 to 5 and 9) are supported at their opposite ends in pairs of laterally spaced bearing brackets 45 and 46, respectively, which are mounted on end plates 13 of the base of the machine and both of these shafts are driven by the motor 47 which is mounted at one end of the machine on the bracket 48 projecting from the end plate 13. The motor 47 has a drive pulley 49 connected by a drive belt 50 with the input pulley 51 of a gear reduction unit 52 which is mounted on the shaft 37 and which has its output gear 53 (Figure 3) connected in driving relation with the pinion 54 on the shaft 37. The shaft 37 carries a sprocket 55 which is connected by the chain 56 with a tensioning sprocket 57 mounted on a stub shaft 58 (Figures 1 and 4) supported in a depending bearing bracket 59 adjustably mounted on the bottom face of the table 10. The upper run of the chain 56 engages with a sprocket 60 on the shaft 38 and drives the shaft 38 in the direction opposite to the direction of rotation of the shaft 37.

The end sprockets 35 for the work feeding chains 33 of the conveyor 16 are keyed to the shaft 37 (Figure 5) while the end sprockets 36 at the other end of the conveyor 16 are rotatably mounted on the shaft 38 so that the shaft 37 serves as a drive shaft for conveyor 32 while the shaft 38 serves merely as a supporting shaft for the end sprockets at the other end of the conveyor. These same shafts carry the end sprockets 35' and 36' of the feeding conveyor 16' for the cutting mechanism at the other side of the machine, the sprockets 36' being rotatably mounted on the shaft 37 and the sprockets 35' being keyed to the shaft 38 which is rotated in the direction opposite to the direction of rotation of shaft 37 as heretofore described. With this arrangement the two parallel shafts support the work feeding conveyors for both the cutting mechanisms and both conveyors are driven from a single source of power with the movement of the conveyors being in opposite directions.

Each of the cutting mechanisms includes a cooperating hold down apparatus mounted above the cutting blade and its associated work feeding conveyor for applying pressure to the work as it is carried through the machine on the upper surface of the feeding conveyor. The hold down apparatus comprises a plurality of pressure rollers 61 (Figures 1, 2, 3, 7 and 8) which are mounted in a generally rectangular compartment forming housing 62. The housing 62 is suspended from a pair of bracket members 63 (Figure 2) which are in longitudinally spaced relation and extend inwardly of a side edge of the table 10. The brackets 63 each have a track formation 64 extending vertically along the outside edge which is received in a trackway 65 provided in the inside face of the upper ends of a pair of generally C-shaped vertically extending supporting brackets 66. The brackets 66 are spaced longitudinally of the machine and the brackets of each pair have their lower ends bolted at 67 to the outside face of a side wall member 12 of the supporting base frame structure.

An adjusting mechanism is provided for controlling the elevation of the housing 62 which comprises a longitudinally extending shaft 68 (Figures 1 and 3) journaled at its opposite ends in bearing members 69 supported on the upper ends of the brackets 66 and having a hand wheel 70 at one end thereof. Each of the bracket members 66 supports at its upper end an upwardly extending adjusting screw 71 (Figures 1 and 2) which is rotatably mounted in a bearing 72 and which has its upper end engaged in a threaded aperture in a bracket member 73 extending outwardly of the upper end of the vertically extending guide member 64 of the bracket member 63. The screw 71 carries a pinion 74 at its lower end which is in engagement with a pinion 75 on the adjusting shaft 68 so that rotation of the shaft 68 turns the screw 71 and raises and lowers the housing 62. A cam lock having a handle 76 is provided on one of the bracket members 66 for engaging the associated track member 64 to lock the housing 62 in the desired adjusted position.

The pressure rollers 61 (Figures 1, 7 and 8) at opposite ends of the housing 62, are rotatably mounted on cross shafts 77 which are supported at their opposite ends in bracket members 78 with the latter pivotally mounted on a cross shaft 80 journaled in the side walls of the houisng 62. Each end of each shaft 77 is connected to the lower end of a vertically extending rod 81 which projects at its upper end through a threaded aperture 82 in the upper wall 83 of the housing 62. An externally threaded pressure adjusting nut 84 is positioned in the threaded aperture 82 and has a bore 85 for receiving the threaded upper end of the rod 81 in sliding relation therein. A compression spring 86 is mounted on the rod 81 and extends between the inner or lower end of the pressure nut 84 and a stop collar 87 on the rod 81. A pair of lock nuts 88 are provided on the upper end of the rod 81 and adjustment of the pressure in the spring 86 is had by rotation of the pressure sleeve nut 84 and the lock nuts 88. The aperture 82 is of sufficient diameter to permit removal through the same of the compression spring 86 when the nuts 84 and 88 are removed, thereby facilitating assembly and replacement of springs 86. The pressure rollers 61 at the center of the housing 62 and immediately above the saw blade 15 are split and mounted on split shafts which are supported on suitable bearing brackets so as to accommodate a saw blade 15 but are otherwise supported on cross shafts 80 and provided with vertically extending spring carrying pressure applying rods 81 so that the pressure on the individual rollers may be adjusted as desired with the force directly through the axis of each adjusting rod or pin 81.

Anti-kickback members 90 (Figures 1 and 2) of angular formation are pivoted at 91 on the housing 62 and operate by gravity to drop behind the edge of the board as it passes beneath the last pressure roller 61. Similar anti-kickback members 92 are provided at the feed end of the table 10 adjacent each of the apertures 14, 14' which are pivoted at 93 to swing by gravity upwardly into the path of the board as the end thereof passes over the member 92.

A drop table for removal of chips is provided at the discharge end of each of the apertures 14, 14' which comprises a top horizontal table section 94 (Figures 1, 3 and 4), depending legs 95 which are pivoted at 96 to a bracket 97 extending from the end plate 13 so that the plate 94 is adapted to swing downwardly about the pivot 96. A link 98 is pivotally connected at 99 to the lower end of the drop table in outwardly spaced relation to the pivot 96 which has its lower end extending through a slot in the horizontal leg of a bracket 100 attached to the bracket 97. The link 98 carries a compression spring 101 which urges the drop table upwardly toward the normal position flush with the top surface of the work table 10.

Each of the cutting or sawing mechanisms has associated therewith a work guiding rip fence 110 and 110'. The rip fence 110 (Figures 1 and 3) for guiding the edge of a board or other work piece as it is advanced to the saw blade 15 is mounted for lateral sliding adjustment on a fence guiding and supporting bar or rail 111 which is secured by brackets 112 to the edge of the table 10 at one end of the machine. The guide fence 110 is of well known construction having a supporting and clamping head indicated at 113 by means of which it is moved along the supporting rail 111 and clamped in the desired position.

In using the machine, two operators are employed, one at each end thereof, for handling the material being cut. One operator feeds the first work piece to the machine for a ripping operation by one of the blades, for example, blade 15 after setting the rip fence 110 to provide the desired cut. The operator on the other side of the machine removes the cut strip and deposits it on a stock pile or conveyor. The remainder of the stock or work piece, if it is suitable for further cutting, is fed by this operator to the cutting mechanism at the other side of the table with the cut being made by the blade 15' as the piece is returned to the first operator. The first operator removes the cut strip resulting from this operation and, if a further strip is to be cut from the stock piece, he feeds the same to the blade 15. The two operators perform substantially the same amount of work and each time a work piece is passed across the work table a cut is made. The final cut may be made by either operator and either operator may start a new work piece through the machine.

While particular materials and specific details of construction have been referred to in describing the machine illustrated, it will be understood that other materials and different details of construction may be resort to within the spirit of the invention.

We claim:
1. A material cutting machine comprising an upright supporting frame having a work top with two parallel laterally spaced elongate tool slots extending longitudinally of the machine, a tool arbor rotatably mounted adjacent each tool slot and a cutting tool mounted on each arbor in operative position in the respective slot, drive means for rotating the arbors in opposite directions, work feeding chain conveyor members having their upper runs positioned in guideways extending in the work top along each side of each tool slot, end supporting sprockets for each of the conveyor chain members, a pair of transversely extending parallel shafts mounted in spaced relation beneath the work top, each of said shafts having mounted thereon the supporting sprockets for adjacent ends of said conveyor chain members, the sprocket at one end of each of said conveyor chain members being secured to its shaft for rotation therewith and the sprocket at the other end of each of said conveyor chain members being rotatably mounted on its shaft, power means for rotating one of said shafts and a drive connection between said shafts for rotating the other one of said shafts in an opposite direction whereby the work is fed to said cutting tools from opposite directions so that a work piece may be fed from either end of the machine for a cutting operation.

2. A straight line rip sawing machine comprising an upright supporting base having a work table top with a pair of parallel laterally spaced longitudinally extending elongate tool slots and feed chain guideways, an arbor on opposite sides thereof rotatably mounted beneath each tool slot for supporting a cutting blade in operative position therein, power drive means for rotating the arbors in opposite directions, work feeding endless chains having their upper runs supported in said guideways, end supporting sprockets for each of said chains, a pair of longitudinally spaced parallel shafts mounted with their axes extending transversely of the work table, each of said shafts having mounted thereon the end supporting sprockets for the corresponding ends of said chains with the sprockets at opposite ends of said chains being keyed on the one shaft and rotatably mounted on the other shaft, respectively, and a common power drive means connected to said shafts for rotating said shafts in opposite directions, each of said arbors and its associated work feeding chains being driven in a direction so that work carried on the chains is cut by the blade on the arbor whereby to enable a work piece to be cut by feeding it lengthwise of the work table first in one direction and then in the opposite direction.

References Cited in the file of this patent

UNITED STATES PATENTS

| | | |
|---|---|---|
| 285,407 | Gretschel | Sept. 25, 1883 |
| 550,825 | Gray | Dec. 3, 1895 |
| 811,009 | Walton | Jan. 30, 1906 |
| 1,074,559 | Osterholm | Sept. 30, 1913 |
| 1,132,840 | Garrett | Mar. 23, 1915 |
| 1,241,871 | Meyers | Oct. 2, 1917 |
| 1,552,665 | Authenrieth | Sept. 8, 1925 |
| 1,573,705 | Hauck | Feb. 16, 1926 |
| 1,700,400 | Carlson et al. | Jan. 29, 1929 |
| 1,770,106 | Johnson | July 8, 1930 |
| 1,796,369 | Hirst | Mar. 17, 1931 |
| 1,816,485 | Johnson | July 28, 1931 |
| 2,585,957 | Meeker et al. | Feb. 19, 1952 |
| 2,613,699 | Dudek | Oct. 14, 1952 |
| 2,623,559 | Gustin | Dec. 30, 1952 |
| 2,780,254 | Carpentiere | Feb. 5, 1957 |
| 2,829,683 | Skinner et al. | Apr. 8, 1958 |

FOREIGN PATENTS

| | | |
|---|---|---|
| 58,190 | Sweden | Jan. 27, 1925 |